(No Model.)
F. N. LANG.
HAND WEEDING TOOL.
No. 324,565. Patented Aug. 18, 1885.
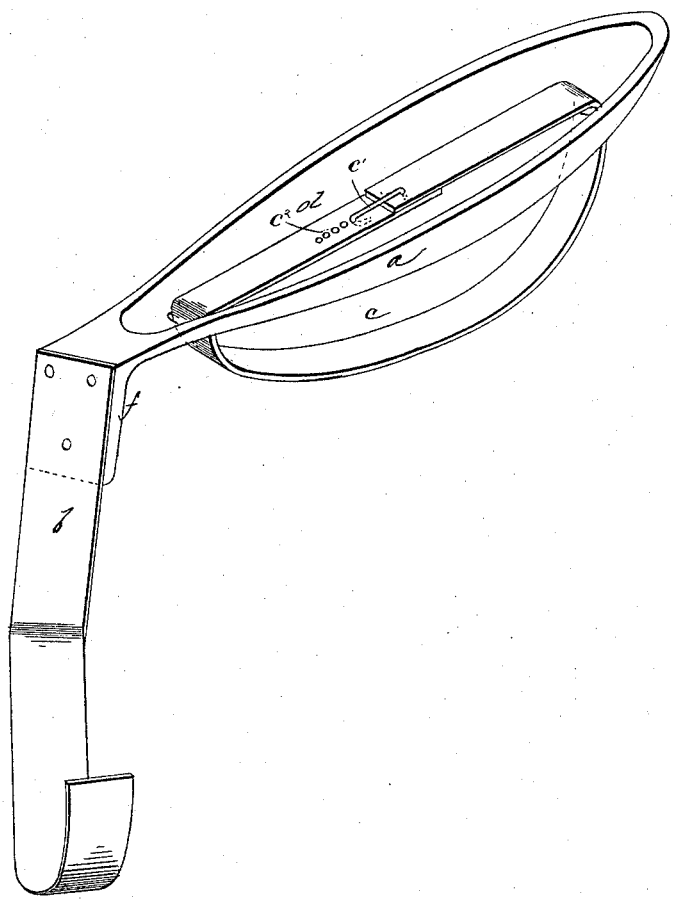

UNITED STATES PATENT OFFICE.

FRED N. LANG, OF BARABOO, WISCONSIN.

HAND WEEDING-TOOL.

SPECIFICATION forming part of Letters Patent No. 324,565, dated August 18, 1885.

Application filed March 28, 1885. (No model.)

*To all whom it may concern:*

Be it known that I, FRED N. LANG, a citizen of the United States, residing at Baraboo, in the State of Wisconsin, have invented certain new and useful Improvements in Hand Weeding-Tools, of which the following is a specification, to wit:

This invention relates to an improvement in hand-weeders; and it consists in the peculiar construction of the same, substantially as will be hereinafter more fully set forth and claimed.

In order to enable others skilled in the art to which my invention appertains to make and use the same, I will now proceed to describe its construction and use, referring to the accompanying drawing, which represents a perspective view of my device.

$a$ represents a metal or wooden handle, preferably the former, to which is attached the steel blade $b$. This blade is a flat piece of steel or other material having either one or both edges sharpened for cutting, and is secured across the end of the handle and projecting on one side obliquely and downward of it, as shown. The blade is, at its lower end, bent in somewhat of U form, as shown, and is thus in the best possible form for use, as it gives to the tool a drawing cut, this being less fatiguing than a side cut.

To the handle is secured a loop, $c$, to secure the implement in the hand. This loop may be cast, with the handle riveted to it, or, as represented, made of a strip of leather, having its ends passed through slots formed in the handle and secured together, the handle being hollowed out slightly, as at $d$, to receive the strap. This form I prefer, as, being flexible, it accommodates itself to the hand of the user.

The implement is grasped by the hand, with the strap or loop passing around the back of the hand and one or more fingers, and it is thus held in position, so that while always handy for use it is not in the way of using the fingers to pull weeds, &c., which is done without dropping the tool. The blade is used for cutting weeds or roots and loosening the earth around the plant in the manner usual with these implements.

The handle is represented as cast with a lug, $f$, on one end, the face of which is obliquely across the end of the handle, and extends outward at an oblique angle therewith for the proper attachment of the blade.

It will be observed that the ends of the strap are not permanently secured together, but one end is provided with a hook, $c'$, and the other with a series of holes, $c^2$, with which the hook is engaged to fit different sizes of hands or a greater or less number of fingers.

Having thus fully described my invention, what I claim as new, and desire to secure by Letters Patent, is—

1. A hand weeding-tool having an adjustable loop upon one side to pass around the fingers when in use, and a blade projecting laterally, obliquely, and downward from one end, and having its point bent up in U form, substantially as and for the purpose set forth.

2. A weeding-tool consisting of a handle formed slightly hollowing on one side and provided with a flexible loop having its ends passed through slots in the handle and secured together, and a blade secured to and projecting laterally, obliquely, and downward from the handle, and having its point turned up in U form, substantially as and for the purpose set forth.

3. A handle for weeding-tools formed hollowing on one side and with slots, and having formed upon one end a lug for attachment to the blade, said lug extending obliquely from one side and its face obliquely across the end of the handle, substantially as described and shown.

In testimony whereof I affix my signature in presence of two witnesses.

FRED N. LANG.

Witnesses:
W. C. MCARTHUR,
FRANK STRATTON.